United States Patent
Ng (10) Patent No.: US 12,360,764 B2
(45) Date of Patent: Jul. 15, 2025

(54) ANDROID SYSTEM DEVELOPMENT METHOD AND APPARATUS, RELATED DEVICE AND COMPUTER-READABLE STORAGE MEDIUM

(71) Applicant: Yat Fai Ng, Hong Kong (HK)

(72) Inventor: Yat Fai Ng, Hong Kong (HK)

( * ) Notice: Subject to any disclaimer, the term of this patent is extended or adjusted under 35 U.S.C. 154(b) by 92 days.

(21) Appl. No.: 17/974,773

(22) Filed: Oct. 27, 2022

(65) Prior Publication Data

US 2024/0061679 A1    Feb. 22, 2024

(30) Foreign Application Priority Data

Aug. 17, 2022   (HK) ............................ 32022058587.3

(51) Int. Cl.
G06F 8/76       (2018.01)

(52) U.S. Cl.
CPC ...................................... *G06F 8/76* (2013.01)

(58) Field of Classification Search
None
See application file for complete search history.

(56) References Cited

U.S. PATENT DOCUMENTS

| | | | |
|---|---|---|---|
| 2017/0031680 A1* | 2/2017 | Kosmiskas | G06F 8/76 |
| 2023/0281369 A1* | 9/2023 | Eavy | G06F 30/398 |
| | | | 716/136 |

FOREIGN PATENT DOCUMENTS

| | | | | |
|---|---|---|---|---|
| CN | 108170503 B | * | 4/2022 | ......... G06F 9/44505 |
| CN | 114691358 A | * | 7/2022 | |

OTHER PUBLICATIONS

Habchi et al., "On Adopting Linters to Deal with Performance Concerns in Android Apps," ACM, 2018, 11pg. (Year: 2018).*
Hecht et al., "An Empirical Study of the Performance Impacts of Android Code Smells," ACM, 2016, 11pg. (Year: 2016).*
Hong et al., "Defining and Detecting Environment Discrimination in Android Apps," ICST, 2017, 20pg. (Year: 2017).*
Mehner, Fritz, "Bash Style Guide and Coding Standard, " version 1.6, 2014, 13pg. (Year: 2014).*

(Continued)

*Primary Examiner* — Ryan D. Coyer (57) ABSTRACT

Embodiments of the present application disclose an Android system development method and apparatus, a related device and a computer-readable storage medium. The method is applied to a terminal device with an Android system, and the Android system is associated with a system environment parameter assigned a first value. The method may include: modifying, by the terminal device, the system environment parameter from the first value to a second value through an object instruction in response to receiving a first modification instruction for the Android system initiated by a user; and running, by the terminal device, the Android system based on the second value of the system environment parameter to cater for operations initiated by the user through the terminal, device, where the performance of the terminal device running the Android system based on the second value of the system environment parameter is better than that based on the first value of the system environment parameter. The implementation of the present application can improve the performance of the Android system to better meet the diversified needs of users.

9 Claims, 4 Drawing Sheets

S101: Receive a first modification instruction for an Android system initiated by a user S102: Modify a system environment parameter from a first value to a second value through an object instruction S103: Run the Android system based on the second value of the system environment parameter to cater for operations initiated by the user through a terminal device (56) References Cited

OTHER PUBLICATIONS

Vendome et al. "How Developers Detect and Fix Performance Bottlenecks in Android Apps," IEEE, 2015, 10pg. (Year: 2015).*
Vivek, "20 build.prop Tweaks to Customize Android in Awesome Ways," Jan. 17, 2019, retrieved from https://www.droidviews.com/20-build-prop-tweaks-to-customize-your-android/, 20pg. (Year: 2019).*

* cited by examiner

ANDROID SYSTEM DEVELOPMENT METHOD AND APPARATUS, RELATED DEVICE AND COMPUTER-READABLE STORAGE MEDIUM

TECHNICAL FIELD

The present application relates to the technical field of software development, in particular to an Android system development method and apparatus, a related device and a computer-readable storage medium.

BACKGROUND

With the advent of Google's new mobile operating system Android 4.1 Jelly Bean, Google's Android platform has shown a strong growth momentum since 2010, resulting in a share increase from less than 10% to more than 50% in the global smartphone market and making the Android system the most widely used mobile terminal system and embedded terminal, system. However, the Android system still falls short in some aspects and needs to be further optimized by engineers. For example, when a user uses multiple gestures, such as flings and scrolls, successively on, a touch screen, the screen sometimes freezes. Therefore, how to improve the performance of the Android system to better meet the needs of users is a technical problem that urgently needs to be solved.

SUMMARY

Embodiments of the present application provide an Android system development method and apparatus, a related device and a computer-readable storage medium, which can improve the performance of an Android system and better meet the diversified needs of users.

In accordance with a first aspect, an embodiment of the present application provides an Android system development method applied to a terminal device with an Android system, the Android system being associated with a system environment parameter assigned a first value. The method may include the following steps:

modifying, by the terminal device, the system environment parameter from the first value to a second value through an object instruction in response to receiving a first modification instruction for the Android system initiated by a user; and running, by the terminal device, the Android system based on the second value of the system environment parameter to cater for operations initiated by the user through the terminal device, where the performance of the terminal device running the Android system based on the second value of the system environment parameter is better than that based on the first, value of the system environment parameter.

According to the embodiment of the present application, when the user perceives that the performance of the Android system needs to be improved, the user initiates the first modification instruction. After receiving the first modification instruction for the Android system initiated by the user, the terminal device modifies the system environment parameter from the first value to the second value through the object instruction; and in this way, the performance of the Android system can be improved to better meet the diversified needs of users.

In a possible implementation, the step of modifying the system environment parameter from, the first value to a second value through an object instruction includes:

importing the second value of the system environment parameter into a /data/property area through an echo instruction.

In a possible implementation, the step of importing the second value of the system environment parameter into a /data/property area through an echo instruction includes:

importing the second value of the system environment parameter into a shell script by a one-time loading through the echo instruction.

In this way, the loading of the second value of the system environment parameter can be efficiently completed with reduced waiting time for users.

In a possible implementation, the terminal device is provided with an audio interface, and the audio interface is provided with a first interface parameter value; and the method further includes:

modifying, by the terminal device, the first interface parameter value of audio offload to a second interface parameter value through the echo instruction in response to receiving a second modification instruction for the audio interface initiated by the user.

In this way, the audio effect of the audio interface can be improved, and users can get a better entertainment experience.

In a possible implementation, the system environment parameter includes at least one of a system security and protection parameter, a system attribute file parameter, a system sleep and standby parameter, an external frequency parameter of a processor, a number of frames transmitted by the system per second, a heap size of dalvik vm, an initial heap size of dalvik vm, minimum value of single heap memory adjustment of dalvik vm, a storage space size corresponding to Net TCP, and a number of windows messages per second.

In a possible implementation, the system security and protection parameter is used for indicating security of the terminal device; the system attribute file parameter is used for indicating performance of the terminal device; the system sleep and standby parameter is used for indicating use efficiency of the terminal device; the external frequency parameter of the processor is used for indicating performance of the processor of the terminal device; and the number of frames transmitted by the system per second is used for indicating network speed of a network module of the terminal device.

In accordance with a second, aspect, an embodiment of the present application provides an Android system development apparatus applied to a terminal device with an Android system, the Android system being associated with a system environment parameter assigned a first value, and the apparatus including a unit for implementing the method according to the first aspect. Specifically, the apparatus may include:

a receiving unit configured to receive a first modification instruction for the Android system initiated by a user;

a first processing unit configured to modify the system environment parameter from the first value to a second value through an object instruction in response to receiving the first modification instruction for the Android system initiated by the user; and a running unit configured to run the Android system based on the second value of the system environment parameter to cater for operations initiated by the user through the terminal device, where the performance of the terminal device running the Android system based on the second value of the system environment parameter is better than that based on the first value of the system environment parameter.

In a possible implementation, the first processing unit is specifically configured to:

import the second value of the system environment parameter into a /data/property area through an echo instruction.

In a possible implementation, the first processing unit is further specifically configured to:

import the second value of the system environment parameter into a shell script by a one-time loading through the echo instruction.

In a possible implementation, the terminal device is provided with an audio interface, and the audio interface is provided with a first interface parameter value; and the apparatus further includes a second processing unit, where the second processing unit is configured to modify the first interface parameter value of audio offload to a second interface parameter value through the echo instruction in response to receiving a second modification instruction for the audio interface initiated by the user.

In a possible implementation, the system environment parameter includes at least one of a system security and protection parameter, a system attribute file parameter, a system sleep and standby parameter, an external frequency parameter of a processor, a number of frames transmitted by the system per second, a heap size of dalvik vm, an initial heap size of dalvik vm, minimum value of single heap memory adjustment of dalvik vm, a storage space size corresponding to Net TCF, and a number of windows messages per second.

In a possible implementation, the system security and protection parameter is used for indicating security of the terminal device; the system attribute file parameter is used for indicating, performance of the terminal device; the system sleep and standby parameter is used for indicating use efficiency of the terminal device; the external frequency parameter of the processor is used for indicating performance of the processor of the terminal device; and the number of frames transmitted by the system per second is used for indicating network speed of a network module of the terminal device.

In accordance with a third aspect, an embodiment of the present application provides a terminal device, including a processor and a memory interconnected to each other, where the memory is configured to store a computer program that enables the terminal device to perform the above method, the computer program including program instructions, and the processor is configured to invoke the program instructions to perform the method of the first aspect described above.

In accordance with a fourth aspect, an embodiment of the present application provides a computer-readable storage medium, which stores a computer program including program instructions that, when executed by a processor, cause the processor to perform the method of the first aspect described above.

In accordance with a fifth aspect, an embodiment of the present application further provides a computer program including program instructions that, when executed by a processor, cause the processor to perform the method of the first aspect described above.

BRIEF DESCRIPTION OF DRAWINGS

In order to more clearly explain the technical schemes of the embodiments of the present application, the drawings needed in the description of the embodiments are briefly set forth below.

DETAILED DESCRIPTION

The technical schemes in the embodiments of the present application will be described below with reference to the drawings of the embodiments of the present application.

Unless otherwise defined, technical terms or scientific terms used in the embodiments of this specification shall have the ordinary meaning understood by those of ordinary skill in the art to which the present invention pertains. The terms "first", "second", etc. used in the embodiments of this specification do not denote any order, quantity or importance, but are only set to avoid confusion between elements.

Unless otherwise specified in the context, throughout the specification, the term "comprise/include" is interpreted as open and inclusive, that is, "comprising/including, but not limited to". In the description of the specification, terms like "an embodiment", "some embodiments", "exemplary embodiment", "example", "specific example" or "some examples" are intended to indicate that a specific feature, structure, material or characteristic related to the ernbodiment(s) or example(s) is included in at, least one embodiment or example of the present disclosure. The schematic representation of the above terms does not necessarily refer to the same embodiment or example. Furthermore, the specific feature, structure, material or characteristic may be included in any one or more embodiments or examples in any suitable way. In the description of some embodiments, words like "couple" and "connect" and their derivatives may be used. For example, when some embodiments are described, the term "connect" may be used to indicate that two or more components are in direct physical or electrical contact. As another example, when some embodiments are described, the term "couple" may be used to indicate that two or more components are in direct physical or electrical contact. The embodiments disclosed herein are not necessarily limited to the contents of this specification.

Overview

With the advent of Google's new mobile operating system Android 4.1 Jelly Bean, Google's Android platform has shown a strong growth momentum since 2010, resulting, in a share increase from less than 10% to more than 50% in the global smartphone market and making the Android system the most widely used mobile terminal system and embedded terminal system. However, the Android system still falls short in some aspects and needs to be further optimized by engineers. For example, when a user uses multiple gestures, such as flings and scrolls, successively on a touch screen, the screen sometimes freezes.

Based on this, an embodiment of this specification provides an Android system development method. According to the Android system development method, when the user perceives that the performance of the Android system needs to be improved, the user initiates the first modification instruction, and after receiving the first modification instruction for the Android system initiated by the user, the terminal device modifies the system environment parameter from the first value to the second value through the object instruction; and in this way, the performance of the Android system can be improved to better meet the diversified needs of users. The technical scheme in the embodiments of this specification will be described below with reference to the drawings in the embodiments of this specification. All other embodiments obtained by those of ordinary skill in the art based on the embodiments in this specification without inventive effort are within the scope of the present invention.

Exemplary Method

Figure 1A:
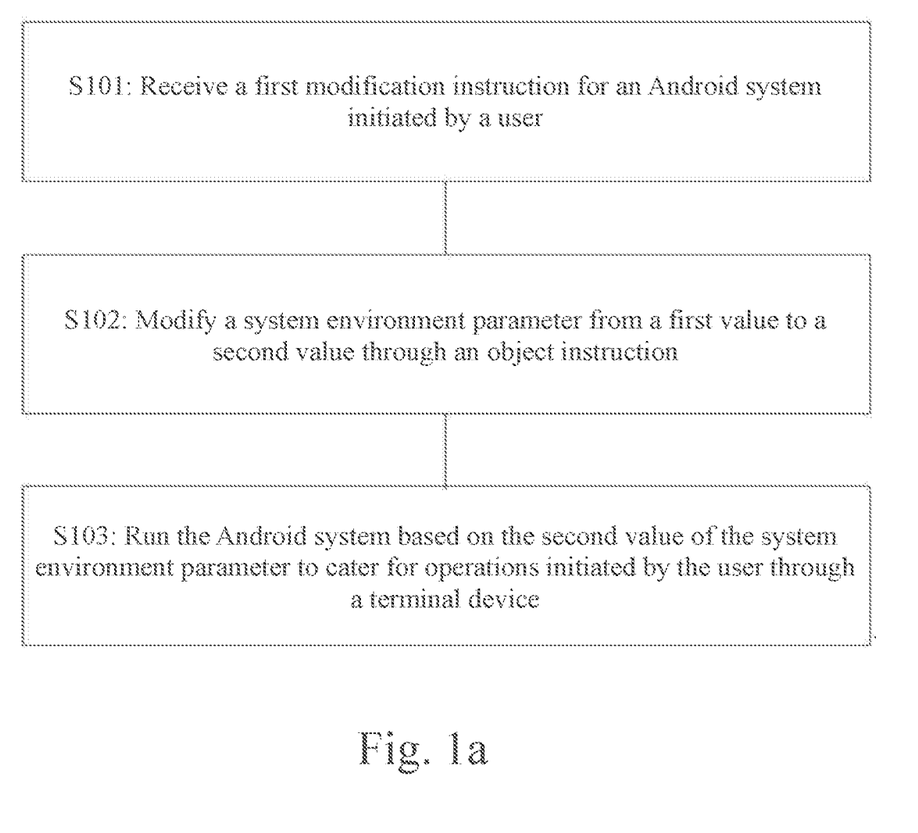
FIG. 1a is a flowchart of an Android system development method provided by an embodiment of the present application.

An Android system development method provided in the present application will be introduced in detail below. The method is applied to a terminal device with an Android system, and the Android system is associated with a system environment parameter assigned a first value. As shown in FIG. 1a, the method may include but is not limited to the following steps.

At S101, a first modification instruction for the Android system initiated by a user is received.

At S102, the system environment parameter is modified from the first value to a second value through an object instruction.

In an embodiment, the step of modifying the system environment parameter from the first value to a second value through an object instruction may include: importing the second value of the system environment parameter, into a /data/property area through an echo instruction. Here, echo is a computer command, which can be based on the Transmission Control Protocol (TCP).

In an embodiment, the step of importing the second value of the system environment parameter into a /data/property area through an echo instruction may include: importing the second value of the system environment parameter into a shell script by a one-time loading through the echo instruction. Here, the shell itself is a program coded in C language, which is a bridge for users to use Linux. Shell is both a command language and a programming language (i.e., shell script). As a command language, it interactively interprets and executes commands input by users; and as a programming language, it defines various variables and parameters, and provides many control structures only existing in high-level languages, including loops and branches. As the second value of the system environment parameter can be imported into the shell script by one-time loading, the loading of the second value of the system environment parameter can be efficiently completed with reduced waiting time for users.

In an embodiment of the present application, the system environment parameter includes at least one of a system security and protection parameter, a system attribute file parameter, a system sleep and standby parameter, an external frequency parameter of a processor, a number of frames transmitted by the system per second, a heap size of dalvik vm, an initial heap size of dalvik vm, minimum value of single heap memory adjustment of dalvik vm, a storage space size corresponding to Net TCP, and a number of windows messages per second. Here, the system security and protection parameter is used for indicating security of the terminal device; the system attribute file parameter is used for indicating performance of the terminal device; the system sleep and standby parameter is used for indicating use efficiency of the terminal device; the external frequency parameter of the processor is used for indicating performance of the processor of the terminal device; and the number of frames transmitted by the system per second is used for indicating network speed of a network module of the terminal device.

At S103, the Android system is run based on the second value of the system environment parameter to cater for operations initiated by the user through the terminal device.

In an embodiment of the present application, the operations initiated by the user through the terminal device may include, but are not limited to: starting WeChat to make voice calls, starting a camera application to take photos, etc.

It should be noted that when the terminal device adopts the Android system development method proposed in the present application to modify the system environment parameter from the first value to the second value through the object instruction, the terminal device can maintain the system performance associated with the second value of the system environment parameter over a period of time; and in this way, an optimal system performance of the terminal device can be ensured.

In an embodiment of the present application, the performance of the terminal device running the Android system based on the second value of the system environment parameter is better than that based on the first value of the system environment parameter. In a subsequent embodiment, some examples are further described to illustrate that the performance of the terminal device based on the second value of the system environment parameter is better.

In an embodiment, after the above step S103, the present application also provides a method for modifying an audio interface parameter. The method may include the following steps.

At S104, a second modification instruction for an audio interface initiated by a user is received.

At S105, a first interface parameter value of audio offload is modified to a second interface parameter value through an echo instruction.

In terms of system sound quality improvement, as the android system defaults to a sample rate of 16-bit, when an external sound card with a sample rate of 24-bit is used, the output sound quality will still be degraded due to resampling. This technology makes the modification to an android native audio interface (i.e. audio offload) to allow source sampling to support 32-bit sound quality, and the source sampling quality is improved at a high bitrate, so that the final output sound quality is improved.

In this way, the audio effect of the audio interface can be improved, and users can get a better entertainment experience.

Figure 1B:
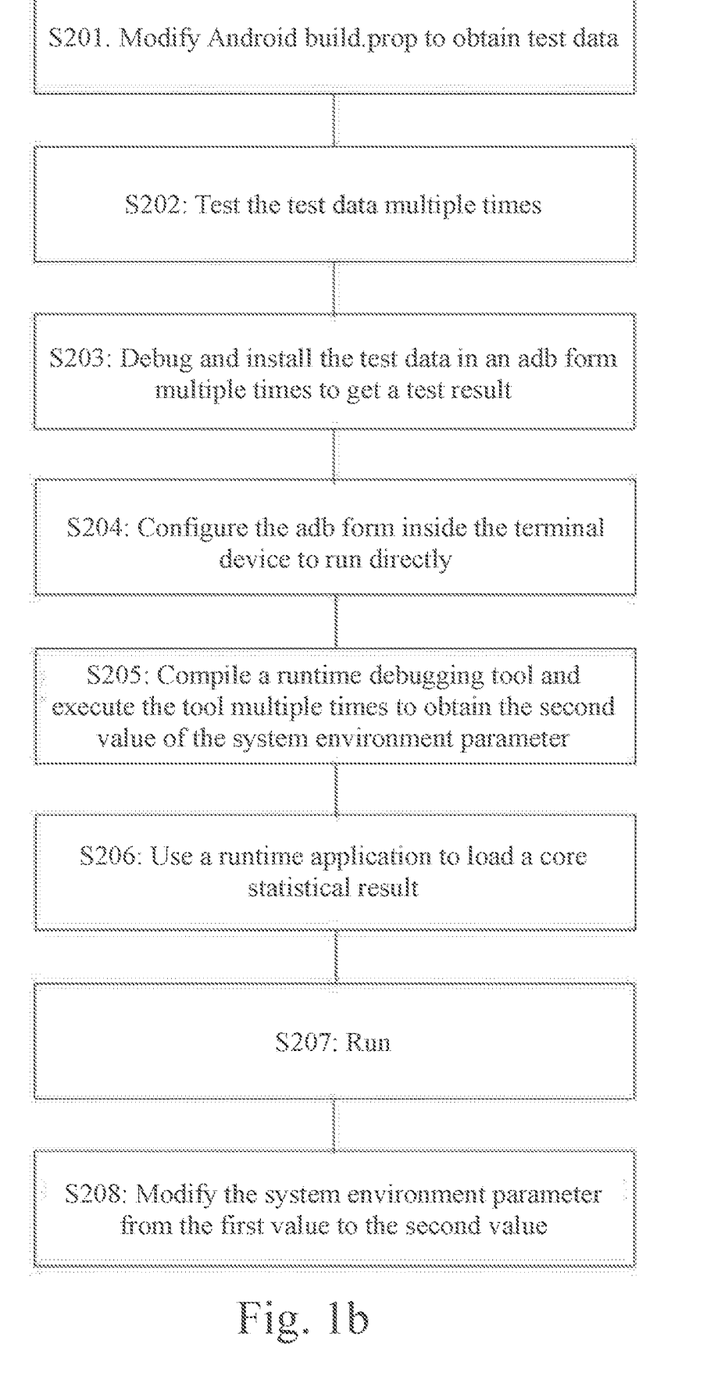
FIG. 1b is a flowchart of another Android system development method provided by an embodiment of the present application.

In order to better understand the Android system development method proposed in the present application, how to obtain the second value of the system environment parameter will be explained in detail below with reference to FIG. 1b, which may include but is not limited to the following steps.

At S201, Android build.prop is modified to obtain test data.

At S202, the test data are tested multiple times.

At S203, the test data are debugged and installed in an android debug bridge (adb) form multiple times to get a test result.

At S204, the adb form is configured inside a terminal device to run directly.

At S205, a runtime debugging tool is compiled and executed multiple times to obtain the second value of the system environment parameter.

At S206, a runtime application, is used to load a core statistical result.

At S207, running is performed.

At S208, the system environment parameter is modified from the first value to the second value, and thus, the Android system carried by the terminal device is associated with the second value of the system environment parameter.

In order to better understand the technical scheme proposed in the present application, how the present application optimizes the performance of the Android system will be described below with specific examples.

In an example, the system environment parameter includes a maximum value of dalvik.vm.heapsize, and dalvik.vm.heapstartsize and a minimum value of dalvik.vm.heapminfree. After modifying the maximum value of dalvik.vm.heapsize, setting dalvik.vm.heapstartsize to 200, and setting the minimum value of dalvik.vm,heapminfree, the principle of android process caching and application suspension is improved. In this way, the response speed of the terminal device can be improved and the resource consumption of the terminal device can be reduced.

In an example, the system environment parameter includes net.tcp.buffersize (storage space size corresponding to Net TCP). After modifying the net.tcp.buffersize, the network download speed can be improved.

In an example, the system environment parameter includes windows msg per sec. After modifying the windows msg per sec, events can be reduced, the interface becomes faster, and power consumption is reduced.

In an example, the system environment parameter includes tune2fs has _journal. After setting JOURNAL rules by using tune2fs has _journal, the access speed of a memory can be improved.

In an example, the system environment parameter includes hw3d.force debug.egl.hw debug.overlayui.enable. After adjusting display values of the interface such as hw3d.force ro.fb.mode debug.egl.hw debug.overlayui.enable, the running efficiency of a GPU can be enhanced.

In an example, the system environment parameter includes ro.vendor.qti.core_ctlmaxcpu and/ro.vendor.qti.core_ctl_min_cpu. After modifying preset values of ro.vendor.qti.core_ctl_max_cpu and iro.vendor.qti.core_ctl_min_cpu to be maximum, the computation efficiency can be improved.

In an example, the system environment parameter includes persist.sys.power_saving_interface. After adjusting the persist.sys.power_saving_interface, the utilization efficiency of a CPU can be improved.

In an example, the system environment parameter includes a ro.cpufreq.super interface. After adjusting the ro.cpufreq.super interface, the processing speed of the CPU can be, improved and overheating of the device can be avoided.

In an example, the system environment parameter includes an FPS clock. After adjusting the internal FPS clock, the network connection speed can be improved. Further, electricity consumption and heat generation will not be increased in a specific environment.

In an example, the system environment parameter includes ro.media.cam.preview.fps//persist.sys.NV_FPSLIMIT//ro.media.enc.hprof.vid.fps/debug.sf.showfps. After adjusting the values of ro.media.cam.preview.fpsfipersist.sys.NV_FPSLIMIT//ro.media.enc.hprof.vid.fps/debug.sf.sh ow/fps and other related interfaces to 120 or above, the processing efficiency of a processor can be improved and power consumption can be reduced.

In summary, when the user perceives that the performance of the Android system needs to be improved, the user initiates the first modification instruction, and after receiving the first modification instruction for the Android system initiated by the user, the terminal device modifies the system environment parameter from the first value to the second value through the object instruction; and, in this way, the performance of the Android system can be improved to better meet the diversified needs of users.

Exemplary Apparatus

Figure 2:
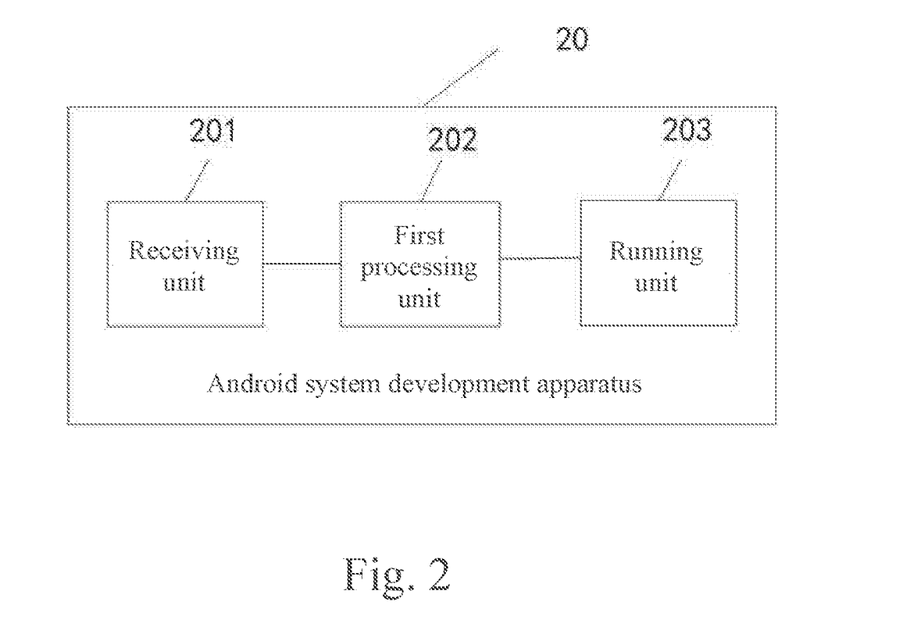
FIG. 2 is a schematic diagram of an Android system development apparatus provided by an embodiment of the present, application.

In order to better implement the above scheme of the embodiments of the present invention, the present invention further correspondingly provides an Android system development apparatus 20 which will be described in detail below with reference to the drawings.

As shown in FIG. 2, the apparatus may include:
- a receiving unit configured to receive a first modification instruction for the Android system initiated by a user;
- a first processing unit configured to modify the system environment parameter from the first value to a second value through an object instruction in response to receiving the first modification instruction for the Android system initiated by the user; and
- a running unit configured to run the Android system based on the second value of the system environment parameter to cater for operations initiated by the user through the terminal device, where the performance of the terminal device running the Android system based on the second value of the system environment parameter is better than that based on the first value of the system environment parameter.

In a possible implementation, the first processing unit is specifically configured to:
import the second value of the system environment parameter into a /data/property area through an echo instruction.

In a possible implementation, the first processing unit is further specifically configured to:
import the second value of the system environment parameter into a shell script by a one-time, loading through the echo instruction.

In a possible implementation, the terminal device is provided with an audio interface, and the audio interface is provided with, a first interface parameter value; and the apparatus further includes a second processing unit; where the second processing unit is configured to modify the first interface parameter value of audio offload to a second interface parameter value through the echo instruction in response to receiving a second modification instruction for the audio interface initiated by the user.

In a possible implementation, the system environment parameter includes at least one of a system security and protection parameter, a system attribute file parameter, a system sleep and standby parameter, an external frequency parameter of a processor, a number of frames transmitted by the system per second, a heap size of dalvik vm, an initial heap size of dalvik vm, minimum value of single heap memory adjustment of dalvik vm, a storage space size corresponding to Net TCP, and a number of windows messages per second.

In a possible implementation, the system security and protection parameter is used for indicating security of the terminal device; the system attribute file parameter is used for indicating performance of the terminal device; the system sleep and standby parameter is used for indicating use efficiency of the terminal device; the external frequency parameter of the processor is used for indicating performance of the processor of the terminal device; and the number of frames transmitted by the system per second is used for indicating network speed of a network module of the terminal device.

It can be understood that functions of the functional units of the Android system development apparatus of this embodiment can be specifically implemented according to the method in the method embodiment shown in FIG. 1. For the specific implementation process, please refer to relevant description of the method embodiment, and details are not to be described here.

In order to better implement the above scheme of the embodiments of the present invention, the present invention further correspondingly provides a terminal device, which will be described in detail below with reference to the drawings.

Figure 3:
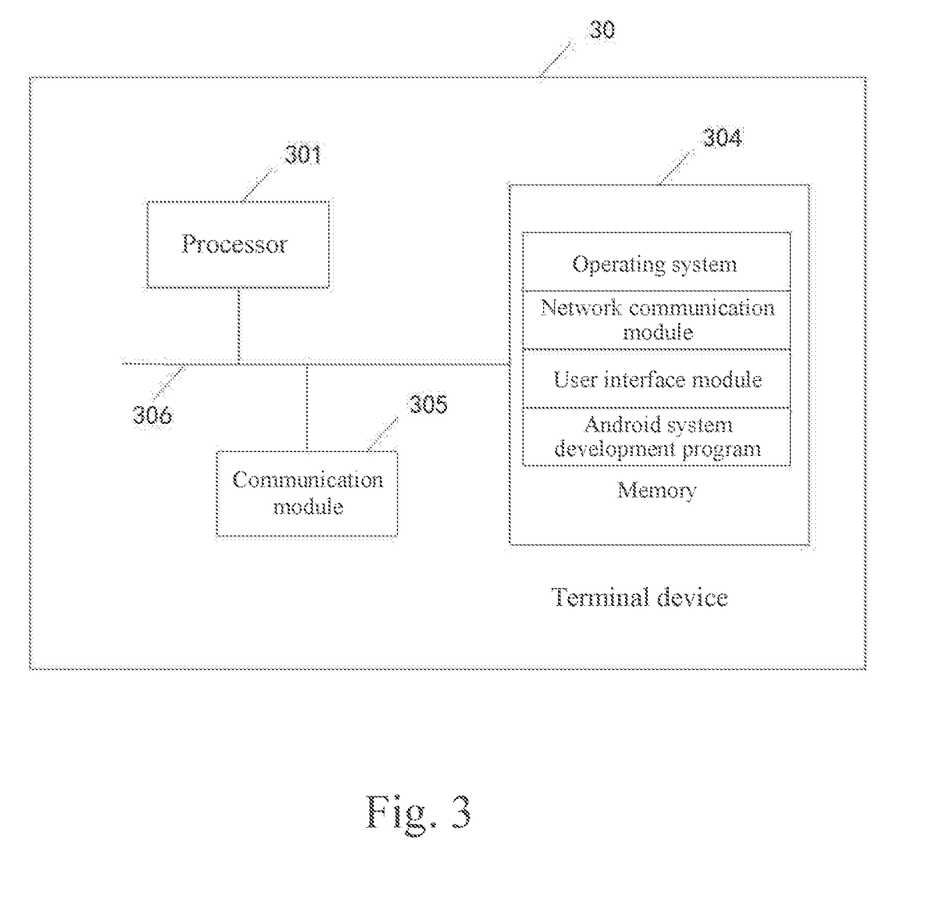
FIG. 3 is a schematic diagram of a terminal device provided by an embodiment of the present application.

As shown in FIG. 3 which is a schematic diagram of a control apparatus provided by an embodiment of the present application, the control apparatus 30 may include a processor 301, a memory 304 and a communication module 305, and the processor 301, the memory 304 and, the communication module 305 may be interconnected via a bus 306. The memory 304 may be a high-speed random access memory (RAM) or a non-volatile memory such as at least one disk memory. The memory 304 may alternatively be at least one storage system located remotely from the aforementioned processor 301. The memory 304 is configured to store application program codes, which may include an operating system, a network communication module, a user interface module, and a data processing program; and the communication module 305 is used for information interaction with external devices. The processor 301 is configured to invoke the program codes to perform the steps of:

modifying the system environment parameter from the first value to a second value through an object instruction in response to receiving a first modification instruction for the Android system initiated by a user; and running the Android system based on the second value of the system environment parameter to cater for operations initiated by the user through the terminal device, where the performance of the terminal device running the Android system based on the second value of the system environment parameter is better than that based on the first value of the system environment parameter.

Here, the step of the processor 301 modifying the system environment parameter from the first value to a second value through an object instruction includes:

importing the second value of the system environment parameter into a /data/property area through an echo instruction.

Here, the step of the processor 301 importing the second value of the system environment parameter into a /data/property area through an echo instruction includes:

importing the second value of the system environment parameter into a shell script by a one-time loading through the echo instruction.

Here, the terminal device is provided with an audio interface, and the audio interface is provided with a first interface parameter value; and the processor 301 is further configured to:

modify the first interface parameter value of audio offload to a second interface parameter value through the echo instruction in response to receiving a second modification instruction for the audio interface initiated by the user.

Here, the system environment parameter includes at least one of a system security and protection parameter, a system attribute file parameter, a system sleep and standby parameter, an external frequency parameter of a processor, a number of frames transmitted by the system per second, a heap size of dalvik % m, an initial heap size of dalvik vm, minimum value of single heap memory adjustment of dalvik vm, a storage space size corresponding to Net TCP and a number of windows messages per second.

Here, the system security and protection parameter is used for indicating security of the terminal device; the system attribute file parameter is used for indicating performance of the terminal device; the system sleep and standby parameter is used for indicating use efficiency of the terminal device; the external frequency parameter of the processor is used for indicating performance of the processor of the terminal device; and the number of frames transmitted by the system per second is used for indicating network speed of a network module of the terminal device. It should be noted that, for the execution steps of the processor in the terminal device 30 in this embodiment of the present invention, reference can be made to the specific implementation in the embodiment of FIG. 1 in the above-mentioned method embodiments, and the details will not be repeated here.

Exemplary Computer Program Product and Storage Medium

In addition to the above methods, apparatus, and device, embodiments of the present application may also provide a computer program product, which includes a computer program instruction that, when executed by a processor, causes the processor to implement the steps in the Android system development method according to any of the embodiments of the present application described in the above "Exemplary method" section of this specification.

Computer program contained in the computer program product for carrying out operations of the embodiments of the present application may be coded in any combination of one or more programming languages, including an object-oriented programming language such as Java, C++, etc., and conventional procedural programming languages, such as the "C" programming language or similar programming languages. The program code may execute entirely on the user's computer, partly on the user's computer, as a stand-alone software package, partly on the user's computer and partly on a remote computer, or entirely on a remote computer or server.

In addition, an embodiment of the present application may also provide a storage medium having a computer program stored thereon, which, when executed by a processor, causes the processor to implement the steps of the Android system development method according to any of the embodiments of the present application described in the above "Exemplary method" section of this specification.

Those of ordinary skill in the art will appreciate that all or part of the flow of implementing the methods of the above-described embodiments may be accomplished by instructing the associated hardware through a computer program that may be stored in a non-volatile computer-readable storage medium and, when executed, may implement the flow of the embodiments of the above-described methods. Here, any reference to memory, storage, database or other media used in the embodiments provided in the present application may include nonvolatile and/or volatile memory. The non-volatile memory may include a read-only memory (ROM), a programmable ROM (PROM), an erasable PROM (EPROM), an electrically erasable PROM (EEPROM) or a flash memory. The volatile memory may include a random access memory (RAM) or an external cache. By way of illustration and not limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), Rambus direct RAM (RDRAM), direct Rambus dynamic RAM (DRDRAM), and Rambus dynamic RAM (RDRAM).

The various technical features of the embodiments described above can be arbitrarily combined. For the sake of simplicity of description, not all possible combinations of the various technical features of the above embodiments are described; however, combinations of these technical features should be deemed as being within the scope of this specification only if there exists no contradiction therebetween.

The above embodiments only set forth several implementations of the present application, the description of which is specific and detailed, however, it should be understood that the embodiments are not intended to limit the scope of the present inventive. It should be noted that modifications and improvements may be made by those of ordinary skill in the art without departing from the concept of the present application. These modifications and improvements all fall within the scope of protection of the present application. Therefore, the scope of protection of the present application patent shall be subject to the appended claims.

The invention claimed is:

1. An Android operating system development method applied to a terminal device with an Android operating system, the Android operating system being associated with a system environment parameter assigned a first value the method comprising:
   modifying, by the terminal device, the system environment parameter from the first value to a second value through an object instruction in response to receiving a first modification instruction for the Android operating system initiated by a user; and
   running, by the terminal device, the Android operating system based on the second value of the system environment parameter for improving the performance of the Android operating system to cater for operations initiated by the user through the terminal device,
   wherein the second value was obtained through the following steps:
      modifying Android build.prop to obtain test data;
      testing the test data multiple times;
      debugging and installing the test data in an android debug bridge (adb) form multiple times to get a test result;
      configuring the adb form inside the terminal device to run directly; and
      compiling and executing a runtime debugging tool multiple times to obtain the second value.

2. The method of claim 1, wherein the step of modifying the system environment parameter from the first value to a second value through an object instruction comprises:
   importing the second value of the system environment parameter into a/data/property area through an echo instruction.

3. The method of claim 2, wherein the step of importing the second value of the system environment parameter into a/data/property area through an echo instruction comprises:
   importing the second value of the system environment parameter into a shell script by a one-time loading through the echo instruction.

4. The method of claim 1, wherein the terminal device is provided with an audio interface, and the audio interface is provided with a first interface parameter value; and the method further comprises:
   modifying, by the terminal device, the first interface parameter value of audio offload to a second interface parameter value through an echo instruction in response to receiving a second modification instruction for the audio interface initiated by the user.

5. The method of claim 1, wherein the system environment parameter comprises at least one of a system security and protection parameter, a system attribute file parameter, a system sleep and standby parameter, an external frequency parameter of a processor, a number of frames transmitted by the system per second, a heap size of dalvik vm, an initial heap size of dalvik vm, minimum value of single heap memory adjustment of dalvik vm, a storage space size corresponding to Net TCP, and a number of windows messages per second.

6. The method of claim 5, wherein the system security and protection parameter is used for indicating security of the terminal device; the system attribute file parameter is used for indicating performance of the terminal device; the system sleep and standby parameter is used for indicating use efficiency of the terminal device; the external frequency parameter of the processor is used for indicating performance of the processor of the terminal device; and the number of frames transmitted by the system per second is used for indicating network speed of a network module of the terminal device.

7. An Android operating system development apparatus applied to a terminal device with an Android operating system, the Android operating system being associated with a system environment parameter assigned a first value, the apparatus comprising:
   a receiving unit configured to receive a first modification instruction for the Android operating system initiated by a user;
   a first processing unit configured to modify the system environment parameter from the first value to a second value through an object instruction in response to receiving the first modification instruction for the Android operating system initiated by the user; and
   a running unit configured to run the Android operating system based on the second value of the system environment parameter for improving the performance of the Android operating system to cater for operations initiated by the user through the terminal device,
   wherein the second value was obtained through the following steps:
      modifying Android build.prop to obtain test data;
      testing the test data multiple times;

debugging and installing the test data in an android debug bridge (adb) form multiple times to get a test result;

configuring the adb form inside the terminal device to run directly; and compiling and executing a runtime debugging tool multiple times to obtain the second value.

8. A terminal device, comprising a processor and a memory interconnected to each other, wherein the memory is configured to store a computer program comprising program instructions, and the processor is configured to invoke the program instructions to perform the method of claim 1.

9. A non-volatile computer-readable storage medium, which stores a computer program comprising program instructions that, when executed by a processor, cause the processor to perform the method of claim 1.

* * * * *